W. P. M. DANA.
LINE FASTENER.
No. 74,203. Patented Feb. 11, 1868.
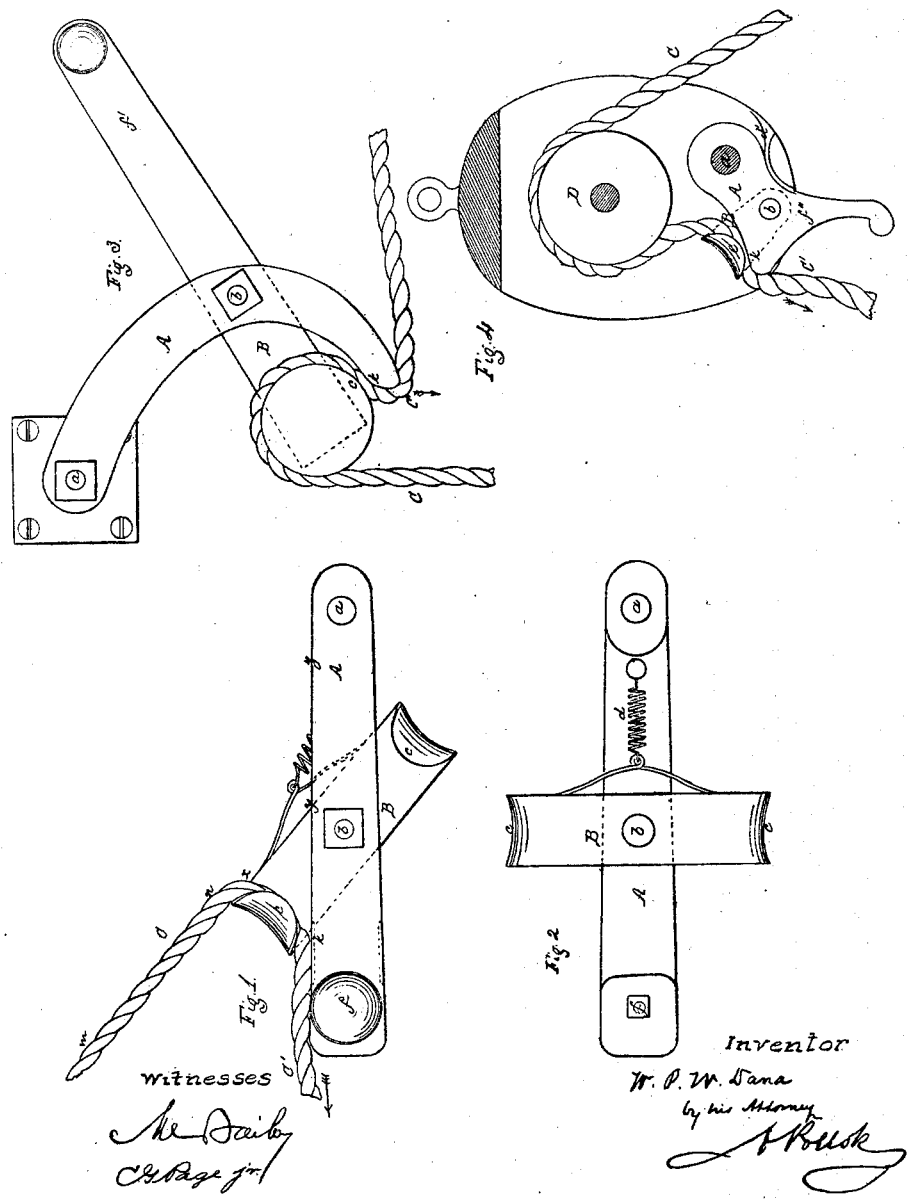

United States Patent Office.

W. P. W. DANA, OF NEWPORT, RHODE ISLAND.

Letters Patent No. 74,203, dated February 11, 1868.

IMPROVEMENT IN LINE-FASTENERS.

The Schedule referred to in these Letters Patent and making part of the same.

TO WHOM IT MAY CONCERN:

Be it known that I, W. P. W. DANA, of Newport, in the county of Newport, and State of Rhode Island, have invented certain new and useful Improvements in Line-Fasteners; and I hereby declare the following to be a full, clear, and exact description of the same, reference being had to the accompanying drawings.

The object I have in view in this invention is to produce a device for fastening lines, ropes, or chains of any description securely and readily—one which may be used in all instances where it is required to secure a line, whether a clothes-line, or the halter of a horse, or any rope used on vessels.

The principle involved in the construction and operation of the device is entirely new, so far as I am informed, in its application to line-fasteners, and is one which admits of the fastener being made simply and economically, at the same time that it operates under all circumstances more effectually than other "self-acting" fasteners.

The invention can best be explained by reference to Figure 1 of the accompanying drawings, which represents an elevation of a simple form of the fasteners.

The device is composed of the arms A, pivoted at one end, $a$, to the wall, or beam, or post, or other part to which it is required to attach the fastener. To this arm, A, is pivoted or hinged a second arm or nipper, B, at the point $b$. The two parts of which the fastener is composed thus move upon different centres, the arm A swinging upon the pivot $a$, the nipper B, while partaking of the movement of the arm A, moving also upon a centre, $b$, of its own. Upon the end of the arm or nipper B, there is a hook, $c$, or other suitable holding-device, for receiving the rope or chain C to be secured. This hook or rope-receiving device extends over the arm A, so that when the nipper B is turned down towards the arm, the hook will catch or rest upon the top of said arm. The rope to be held is passed over that end of the hook which is furthest from the point where the fast end of the rope is attached, and is then drawn down under the hook. In order to tighten the rope, it is drawn by the end $c'$, in the direction indicated by the arrow. When this end of the rope is released, the strain of the rope upon the fastener will force the nipper B tightly down upon the arm A, the rope being grasped and held between the arm and the end of the hook $c$. This grasping action of the fastener results from the movement of the arms A and B upon their respective pivots or centres of motion $a\ b$. The action of the rope upon the arms is to draw them, so that they shall both lie in the prolongation of the line of the rope, or, in other words, to reduce the broken line $x\ y\ z$ to a straight line, which shall lie in the same direction as the line $m\ n$ of the rope. The free ends of the arm A B are thus forced toward each other, and the rope, which passes under the end of the hook-arm B, is consequently grasped and held tightly between them. The arm A is pivoted, so as to admit of the fastener adjusting itself to the direction of the rope; for instance, if the rope C had a more vertical position than that shown, the arm A, swinging upon its pivot, would adjust itself to this change of position. It is therefore evident that if the rope runs at a certain determinate angle when stretched, the arm A consequently occupying but one position, the arm need no longer be capable of vibrating, but it may be secured in proper position, so as to be immovable. For instance, if the rope C run at all times in the direction shown in fig. 1, the arm A may be fastened immovably in the position shown in the same figure, for after the angle at which the arm must stand with respect to the rope, in order to assure the griping action of the nipper B, is ascertained, it is not necessary that the arm should be capable of vibrating, but it may, as above stated, be fastened and held at such angle. The fastener, when working on the two centres $a\ b$, operates as a lever of the third order, the power being applied between the fulcrum and the weight. The pivotal point $a$ represents the fulcrum, the degree of force required to hold the rope between the hook and the arm at $k$, the weight or resistance, and the strain or drawing-action of the taut rope at $b$, the power. It is therefore evident that the distance between the fulcrum-point $a$ and the pivotal point $b$, where the power is applied, must be increased or lessened, in proportion to the increase or decrease in the distance between the points $b$ and $k$, so that sufficient power may at all times be obtained to induce the griping action of the nipper B.

From the above it will be perceived that under my invention the arm A may, according to circumstances, be secured either immovably, or so as to be capable of a vibrating movement, at the same time being arranged in all instances to stand at such an angle with respect to the stretched rope that the end of the latter shall be held tightly between the griper or nipper B and the arm A.

I have described, in illustration of the invention, a simple form of the fastener, which may be subjected to numerous modifications, without departing from the principle involved in its construction and operation.

In fig. 1, the hook or griper B is made double, one hook extending out on each side of the arm, from the common pivot b. The arm A is recessed on one side, as shown in the rear view of the device, fig. 2, so as to allow free play to the griper pivoted in such recess, without interfering with the swinging movement of the part A, and a spiral spring, d, fastened at one end to the arm A, is attached at about midway between the two hooks c to the griper B, the object of this latter arrangement being to prevent the griper from moving unnecessarily when not in use, and to hold the hooks in such position that the rope may be passed under either of them without difficulty. A fastener of this construction is of special use on a vessel to secure the sheet, whether on starboard or larboard tack, the fastener, for this purpose, being secured by a swivel-joint, or otherwise suitably mounted in the stern of the vessel. In order to release the rope C, a handle or knob, f, is secured to the free end of the arm A. By pulling on this handle, so as to draw down the arm A, the latter will be separated far enough from the griper to allow the rope to be cast off, or slackened to any degree desired. The formation of the hook b admits of the rope being removed from the fastener readily and without difficulty.

In fig. 3 a modified form of the fastener is shown. The arm A in this case is curved, the bar or piece of which the griper B is formed, is extended beyond the point b, so as to form a handle, f', which is used for the same purpose as indicated in the case of the handle f, above referred to.

Figure 4 represents a fastener, applied in connection with a pulley, D. It is hung upon a pivot, a, in suitable position between the sides of the pulley-block.

The end of the rope which is to be held by the fastener is passed under the hook of the griper, and in order to draw the rope taut is pulled in the direction of the arrow. As soon as the rope is stretched, it will, as indicated in the drawings, cause the griper and arm to hold it firmly between them. The piece A, when the rope is to be released or slackened, can be pulled down by the handle f'', so as to loosen the hold of the fastener upon the rope. A spring, d', is applied to the rear of the piece A, as indicated in the figure, to hold it in proper position These are but few of the modifications which may be made in the construction of the fastener, but they are sufficient to illustrate the principle of the invention, and the combined action of the arm A and griper B. The latter, instead of having a hook, such as shown in the drawing, may have any other form adapted to hold the rope; as, for instance, the griper may be formed of a loop of metal, straddling the arm A, a roller or pulley being mounted between the sides of the loop, or the hook b may be replaced by a knob, any device suitable for holding and griping the rope being adapted to my purpose.

The fastener may be made of any suitable material, and its size and dimensions as well as the strength of its material will of course be determined by the particular use for which it is designed.

Having now described my invention, and the manner in which the same is or may be carried into effect, what I claim, and desire to secure by Letters Patent, is—

1. A line-fastener, in which the griping-hook, or its equivalent, is combined with a vibratory arm, to which it is pivoted or hinged, substantially as described, so that the strain of the tightened rope which passes under the hook, shall force together the said hook and vibratory arm, and cause the rope to be griped and held between them, as set forth.

2. In combination with an arm or bar capable of a vibratory motion, as set forth, I claim the double hook or griper, with or without the spring by which said hook is held in position, substantially as herein shown and described.

3. The line-fastener herein described, in combination with a pulley and pulley-block, under the arrangement and for operation as set forth.

In testimony whereof, I have signed my name to this specification before two subscribing witnesses.

W. P. W. DANA.

Witnesses:
SAML. W. FRANCIS,
DUNCAN C. PELL.